United States Patent [19]

Jones

[11] 4,237,378
[45] Dec. 2, 1980

[54] PHOTOELECTRIC APPARATUS FOR DOCUMENT COUNTING AND OVERLAP DETECTION

[75] Inventor: Alan P. Jones, Levittown, Pa.

[73] Assignee: Brandt-Pra, Inc., Cornwells Heights, Pa.

[21] Appl. No.: 865,316

[22] Filed: Dec. 28, 1977

[51] Int. Cl.³ .............................................. G01V 9/04
[52] U.S. Cl. ................................. 250/223 R; 356/434
[58] Field of Search ............... 250/205, 223, 560, 561, 250/214 R, 209; 356/71, 432, 434

[56] References Cited

U.S. PATENT DOCUMENTS

| 3,026,419 | 3/1962 | Aweida | 250/223 R |
| 3,614,419 | 10/1971 | Daughton et al. | 250/223 R |
| 4,097,731 | 6/1978 | Krause et al. | 356/434 |

FOREIGN PATENT DOCUMENTS

| 834125 | 11/1957 | United Kingdom . |
| 918077 | 1/1961 | United Kingdom . |
| 1007044 | 1/1963 | United Kingdom . |
| 1007805 | 10/1963 | United Kingdom . |
| 1342656 | 4/1971 | United Kingdom . |

Primary Examiner—David C. Nelms
Attorney, Agent, or Firm—Weinstein & Sutton

[57] ABSTRACT

Electronic counting and control means are provided which are sensitive to the transmissivity of light and include feedback means for controlling the brightness of the light source to extend its life. Additionally, integrating means are provided for determining when there is an overlap of documents being handled by the counting means. Further, specific circuit arrangements are provided for insuring that an exact count is obtained even when perforated documents are being counted and there is a gap between successive documents.

8 Claims, 14 Drawing Figures

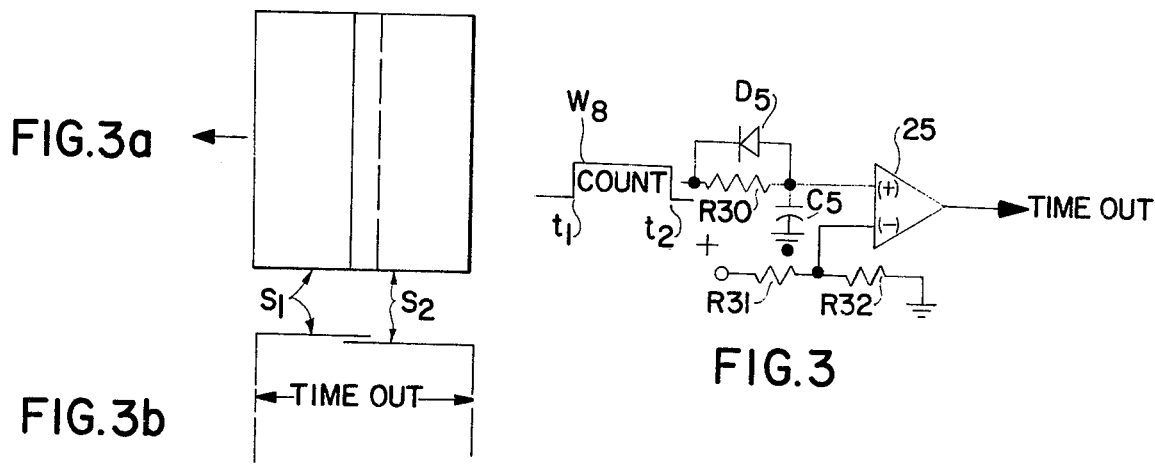
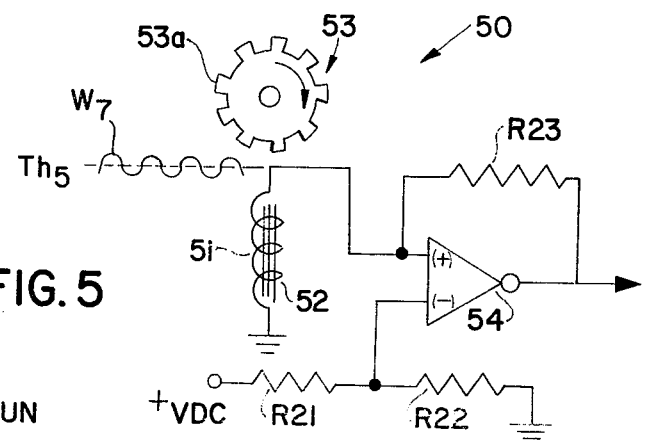
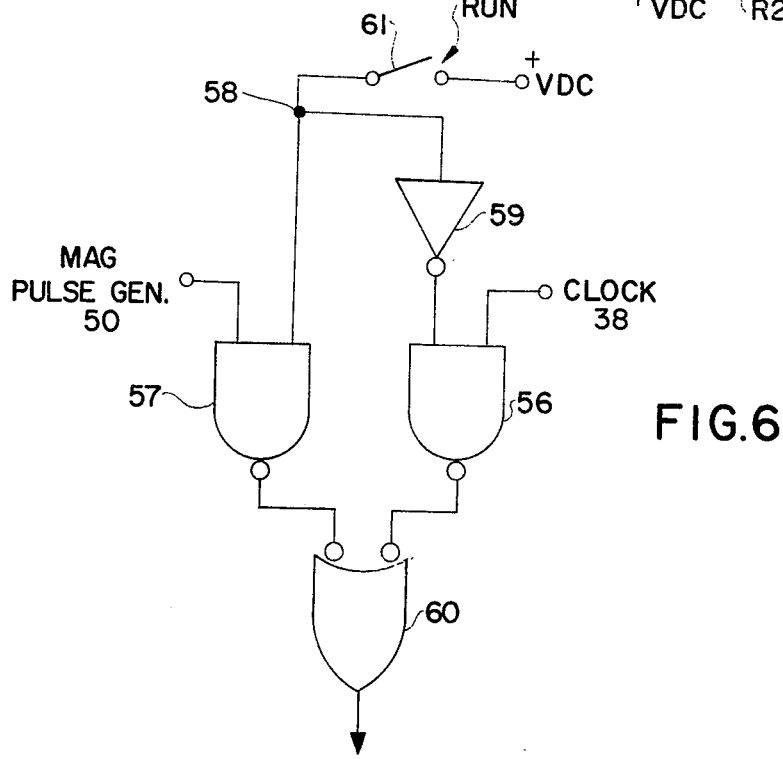

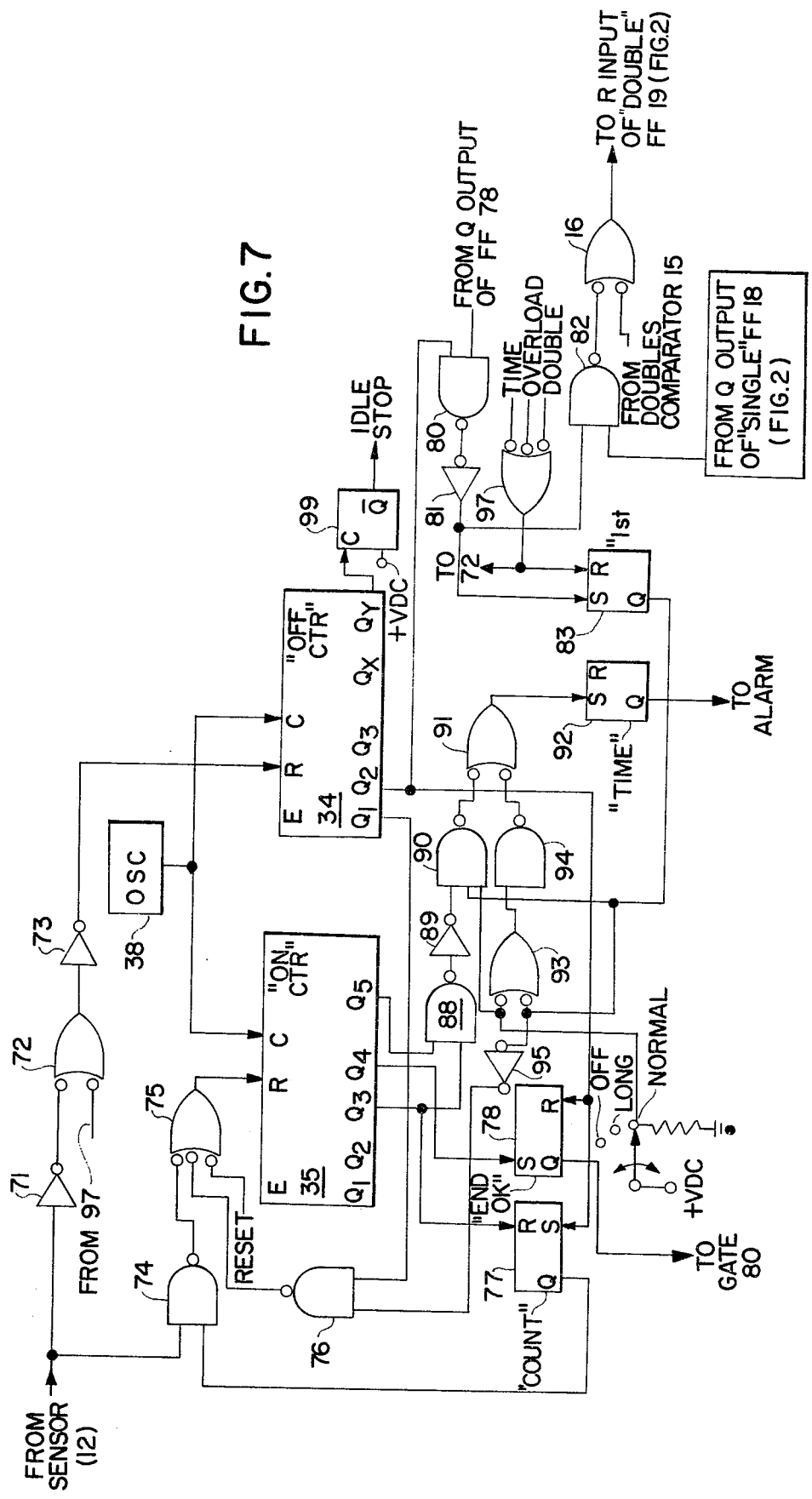

PHOTOELECTRIC APPARATUS FOR DOCUMENT COUNTING AND OVERLAP DETECTION

BACKGROUND OF THE INVENTION

In document handling devices of the type described for example in U.S. Pat. No. 4,054,092 issued Oct. 18, 1977 and assigned to the assignee of the present invention, there is taught therein apparatus for bottom feeding of documents placed in an infeed hopper, and passage through a region containing feed means and stripper means to separate documents so as to be passed from the aforesaid region toward an outfeed stacker on a one at a time basis, the stripping action serving to assure the delivery of single fed documents under normal conditions.

As the documents leave the aforesaid region, they come under the influence of acceleration means which abruptly accelerates the document which has just left the influence of the drive and stripper means so as to form a gap of at least a predetermined length between the document being accelerated and the next succeeding document to be accelerated. This gap is utilized, in conjunction with light means such as an LED and light sensing means such as a phototransistor to detect the change in brightness in order to distinguish the movement of a document between the light source and light sensing element from the passing of a gap therebetween. The documents continue to move from this location where they are neatly stacked in an outfeed stacker.

In many operations it is quite often necessary to be absolutely assured that the document count be exact. For example, when counting currency and especially when counting currency of large denominations, an error in the count of documents, no matter how small, is nevertheless cause for great concern.

One of the problems which contributes to the possibility that such errors might occur is the possibility that the currency, when in use, may acquire or have deposited thereon sticky or adhesive material or may have creases or other mutilations which cause two documents to adhere to one another and to fail to separate even as a result of the stripping operation. If two such documents are fed so that one is directly super-imposed upon the other, the apparatus will count this anomaly as a single document, thus throwing off the count. It is therefore imperative in many applications to provide means for positively and reliably detecting such conditions.

In addition to the above, and due to the fact that the documents being counted may be vastly different in age and amount of use, as well as the fact that they may be fed in any one of four different orientations, the problem of distinguishing between single fed documents and double fed documents is compounded.

BRIEF DESCRIPTION OF THE INVENTION

The present invention is characterized by utilizing a comparator and integrator technique for accurately and reliably distinguishing between single and double fed documents.

The light source and photo-transistor cooperate with one another as was mentioned hereinabove so that the photo-transistor output is available as the signal to be analyzed for purposes of distinguishing between single and double fed documents.

In addition to the above, novel current amplification means is utilized within a feedback circuit coupled between the photo-transistor and light source to adjust the brightness output of the light source as a function of the activity of the photo-transistor.

Adjustable current limiting means are also employed in conjunction with the LED so as to cause the LED to generate light within a brightness range which limits the operating range of the photo-transistor to that portion of its output current versus input characteristic curve so that the photo-transistor operates over that portion of the curve in which the greatest difference is developed in output current when the light directed toward the photo-transistor is attenuated by single and double fed documents.

Comparator means compares the output signal of the photo-transistor feedback circuit against a predetermined threshold. Since the light transmission characteristics of single fed documents may be the same for double fed documents over at least portions of their surfaces, the comparator output signal is filtered or integrated to distinguish double fed from single fed documents by the number of transitions or, another way of characterizing the situation is by the total integrated value of the transitions over the length of the document measured in the feed direction.

Means are provided for setting the threshold level dependent upon the type and nature of the documents being handled and/or counted. A "warning" circuit is provided to protect the user against the possibility of either switching to the incorrect setting or failing to switch from the previous setting for another type of document when a run of different type of documents is to be initiated. In this circuit, means are provided for generating a "doubles" indication when the setting provides too much brightness. The normal doubles detection circuit will provide a doubles indication even for single fed documents, when the selected setting provides insufficient brightness.

The control system is provided with further means for detecting the presence of even slightly overlapping documents through the employment of a time-out circuit which may be comprised of either integration means and comparator means or a counter circuit which may utilize a count pulse signal level for enabling pulses from a constant output frequency oscillator to be accumulated in the counter, whereby the time between pulses represents distance travelled or alternatively by accumulating pulses from a speed sensing means comprised, for example, of a magnetic timing gear rotated in synchronism with the rollers driving the documents and magnetic sensor means for generating pulses representative of the timing gear teeth passing the sensor means.

A novel means is provided for counting the documents and for preventing holes, punches, tears or other mutilations within a document from being falsely interpreted as a gap between documents so as to assure a proper count. This is accomplished by counting pulses through either of the two above techniques mentioned in connection with the counter time-out circuit for accumulating the train of pulses in a first counter during periods in which the counter photo-transistor detects light from the counter LED of a high intensity or brightness and for accumulating said train of pulses in a second counter during those intervals in which the photo-transistor detects a reduced brightness output from the counting LED. A count of sufficient length indicates the presence of a gap between adjacent fed documents to develop a count pulse while a count exceeding a predetermined quantity in the first of said counters provides a time-out signal indicative of the fact that overlapping documents have passed through the device. This technique greatly improves the counting accuracy and the ability to discriminate between normal gaps between documents and punched holes, mutilations and the like within documents.

OBJECTS OF THE INVENTION AND BRIEF DESCRIPTION OF THE FIGURES

It is therefore one object of the present invention to provide a novel light source and light detector circuit incorporating brightness control means for increasing circuit sensitivity and significantly increasing component life.

Another object of the present invention is to provide a novel detection circuit for detecting the presence of double fed documents and employing integrating means and comparator means to successfully distinguish between single and double fed documents.

Another object of the present invention is to provide novel document counting means comprising first and second counting means cooperating with light source and photo-detector means for counting pulses in the first counter as documents pass between the light source and detector means and for accumulating pulses in the second counter as the gap between documents passes between the light source and detector means whereby the accumulation of at least a predetermined count in one of said counters is utilized to provide an accurate count of the documents being handled by the document handling device.

Still another object of the present invention is to provide a document counting device of the type described here and above and employing speed sensor means.

The above as well as other objects of the present invention become apparent when reading the accompanying description and drawings in which:

FIG. 3 is a schematic diagram of a time-out circuit designed in accordance with the principles of the present invention for identifying overlapping documents in the document handling device.

FIGS. 3a and 3b are schematic diagrams showing document overlap.

FIG. 5 shows a magnetic sensing circuit which may be utilized with the counting circuit of FIG. 4, and FIG. 6 shows circuitry for selecting one of the circuits of FIGS. 4 and 5 to drive the counters.

FIG. 7 is a more detailed schematic of the counting apparatus of FIG. 4.

DETAILED DESCRIPTION OF THE INVENTION AND PREFERRED EMBODIMENTS THEREOF

The electronic sensing and control circuitry to be described herein in detail is useful with document handling and counting devices and especially that apparatus taught in U.S. Pat. No. Re. 29,470 reissued Nov. 8, 1977 and assigned to the assignee of the present invention.

A detailed description of the document handling and counting apparatus described therein will be omitted herein for purposes of simplicity. For purposes of understanding the present invention it is sufficient to understand that such apparatus accepts documents in an infeed hopper, advances the documents to a combination of feeding and stripping rollers which corrugate the documents i.e. urge them into an undulating configuration so as to cause the documents to be fed single file through the feeding and stripping rollers in order to be advanced to acceleration rollers for abruptly accelerating the feeding velocity of the documents to provide gaps of a predetermined dimension between adjacent edges thereof, the distance of length of said gaps being measured in the feed direction. A suitable light source such as a LED and a light sensitive means such as a photo-transistor, are positioned on opposite sides of the path of movement of the documents after the aforementioned gaps are formed for the purpose of counting the documents.

Apparatus of the type described here and above is capable of handling and counting documents at speeds of the order of over 600 to 1200 documents per minute thus yielding a device which is extremely advantageous for use in counting and/or endorsing items such as checks, food stamps, paper currency, coupons and the like.

Since documents of the above mentioned categories may have rather significant value such as, for example, paper currency, in applications wherein it is desired to form batches of the paper currency of a predetermined quantity, it is extremely important to be able to form and count such batches with the highest precision which is practical of being obtained. In many situations the capability of forming batches of precise quantities may not be the fault of the equipment. For example, two bills may stick together as a result of having been folded or creased or having come into contact with a glue, adhesive or other sticky substance which makes it a practical impossibility to separate the paper currency even when using the most advanced equipment available. It thus becomes extremely advantageous to provide apparatus for detecting the presence of double fed documents in order to abruptly halt the equipment and thereby identify the double fed condition, typically by causing the double fed documents to be the last ones fed into the outfeed hopper.

Figure 1B:
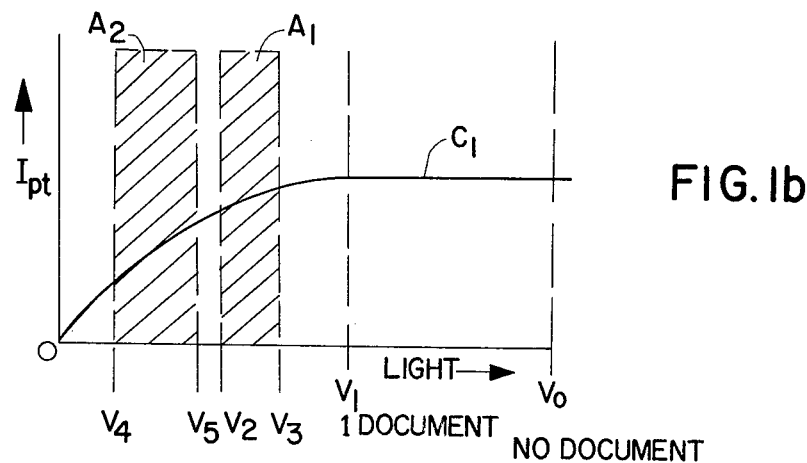
FIGS. 1a through 1e show plots useful in describing the novel circuitry of the present invention.
Figure 1A:
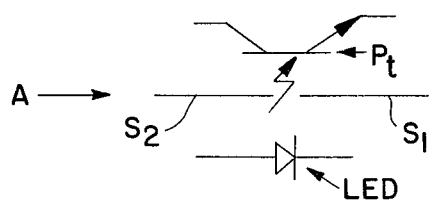

The technique utilized for doubles detection is to provide a light source such as the LED shown in FIG. 1a and a photo-transistor Pt respectively arranged on opposite sides of the path of movement of documents as represented by arrow A. The figure shows two such documents S1 and S2 moving in the direction shown by arrow A as a result of the document handling apparatus referred to here and above and disclosed in U.S. Pat. No. Re. 29,470 Light from the LED is directed toward the photo-transistor which functions in a manner such that its conductivity changes in direct proportion to the magnitude of light striking the photo-transistor. The plot shown in FIG. 1b shows a curve C1 representing the relationship between increasing intensity of light reaching the photo-transistor and plotted against the current generated by the photo-transistor. Curve C1 can be seen to reach a plateau at a light intensity value v1 which basically indicates that the transistor has saturated. Thus any increase in intensity of light above the value v1 causes an insignificant change in the magnitude of current generated by the photo-transistor. The vertical line through the value v0 represents the intensity of light when no documents are passing between the LED and the photo-transistor. It can be seen that the amount of light intensity generated by the LED should preferably be regulated so as to cause the photo-transistor Pt to function at and below the "knee" portion of curve C1 so as to generate the most significant differences in current magnitude responsive to the amount of light transmitted through single fed documents and double fed documents. Assuming proper regulation, the cross-hatched area A1 which lies between the intensity values v2 and v3, represents the range of brightness or light intensity reaching the photo-transistor after passing through a particular type of document which, for example, may be U.S. paper currency of one dollar denomination. The right hand end of this range, i.e. the value v3 represents the amount of light intensity reaching the photo-transistor for new, clean paper currency while the value v2 represents the amount of light reaching the photo-transistor during the time in which an old one dollar bill is passing therebetween, the drop in light intensity reaching the photo-transistor being a function of the smudges or other foreign matter which may have accumulated on the bill as a result of its length of use and the type of handling it has undergone.

In a similar fashion, the cross-hatched area A2, defined by the vertical lines v4 and v5, represents the range of light intensity reaching the photo-transistor from the LED when two double fed bills pass therebetween. In a similar fashion, the right hand end v5 of the intensity range represents the double feeding of two crisp new bills while the left hand end v4 of the range represents the feeding of two old and well used bills. Other factors tending to affect light intensity are the orientation of the bills and combination of orientation of two bills when double fed.

As a practical matter, although the two areas A1 and A2 are shown as being separate from one another, it should be understood that it is common to expect that these ranges will in fact overlap, which is more the rule than the exception, thus further complicating the discrimination of single and double feeds.

In any case, it is most advantageous to control the light intensity reaching the photo-transistor to lie within the limits of the positive slope at and below the "knee" of curve C1 in order to be assured that the largest differences in current output of the photo-transistor are developed to more easily distinguish between each of the possible feed conditions. For example, if the LED were operated so that the light intensity for the single fed and double fed bills whose ranges are given by the cross-hatched areas A1 and A2, were to be shifted for example to the region between the values v1 and v0, even though changes in intensity occur over this range, the current output of the photo-transistor can be seen to change insignificantly and, as a practical matter not at all, so as to provide no practical method for detecting the difference between single fed and double fed documents. The aforesaid adjustment is controlled by providing suitable current control or current limiting means as will be more fully described here and below.

Figure 1C:
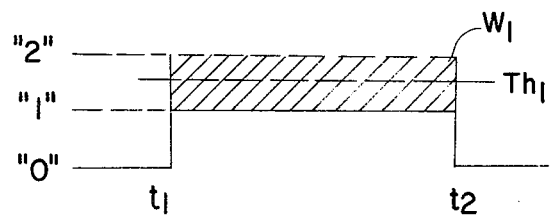

Turning to a consideration of FIG. 1c, the "ideal" condition is shown therein wherein the waveform W1 represents the passage of a paper document (such as U.S. paper currency) between the LED and the photo-transistor Pt and amplification and inversion by amplifier wherein, at time t1 the leading edge of a square pulse is generated and the pulse reaches a value "1" in the presence of a single bill. The level remains constant at "1" over the entire length of the bill (assuming the "ideal" bill has a uniform light transmission characteristic over its surface) and at time t2 the trailing edge of the square pulse is formed at which time the trailing edge of the document passes the LED and photo-transistor.

In a similar fashion, presuming two such "ideal" bills are firmly glued together, the dotted curve of FIG. 1c results wherein at time t1, the leading edge of the waveform $W_1$ is generated and the square pulse reaches a value of "2", remains constant until time t2 at which time the trailing edge is formed as the two double fed documents pass beyond the LED and photo-transistor. These very ideal wave shapes make it a simple matter to compare the resulting signals for single and double fed documents in a comparator by establishing a threshold level represented by the dotted line Th1 is preferably half the distance between the values "1" and "2", i.e. which is one and one half ($1\frac{1}{2}$) volts presuming the other values to be one volt and two volts respectively.

Although the above solution is most satisfactory when dealing with "ideal" bills and conditions, as a practical matter this does not represent the true conditions obtained during document handling and counting. The more realistic picture is represented by the waveforms W2 and W3 shown in FIG. 1d wherein at time t1 waveform W2 undergoes no change and, in fact undergoes no change until the value $t1 + \Delta t$ occurs at which time a small spike results due to an increase in the light transmission characteristic of the bill. The remainder of the curve can be seen to be quite erratic.

A rather similar result can be seen to result when double fed documents pass between the photo-transistor and LED with the exception that the curve can be seen to jump to a significantly higher value at time t1.

From a consideration of these two waveforms which more truly represent actual operating conditions, it becomes much more difficult to establish a threshold level which can be relied upon to distinguish double fed documents from single fed documents in every case. For example, considering the threshold level represented by dotted line Th2, although the curve W3 can be seen to lie above this level for a greater period of time than waveform W2, it can nevertheless be seen that the waveform W2 does make transitions which surpass this level. By setting an even higher threshold Th3 it can be seen that the wave form W3 does not lie above this threshold level over the entire time interval and in fact the waveform W2 can be seen to rise above this threshold level for at least a brief portion of the time interval t1–t2.

However, it has been observed that when the proper threshold level is selected for the type of bills being handled, single fed documents will make only a frew transitions above the threshold level while double fed documents will make a number of transitions above the threshold level said number being significantly greater than the transitions made by the single fed documents.

Figure 2:
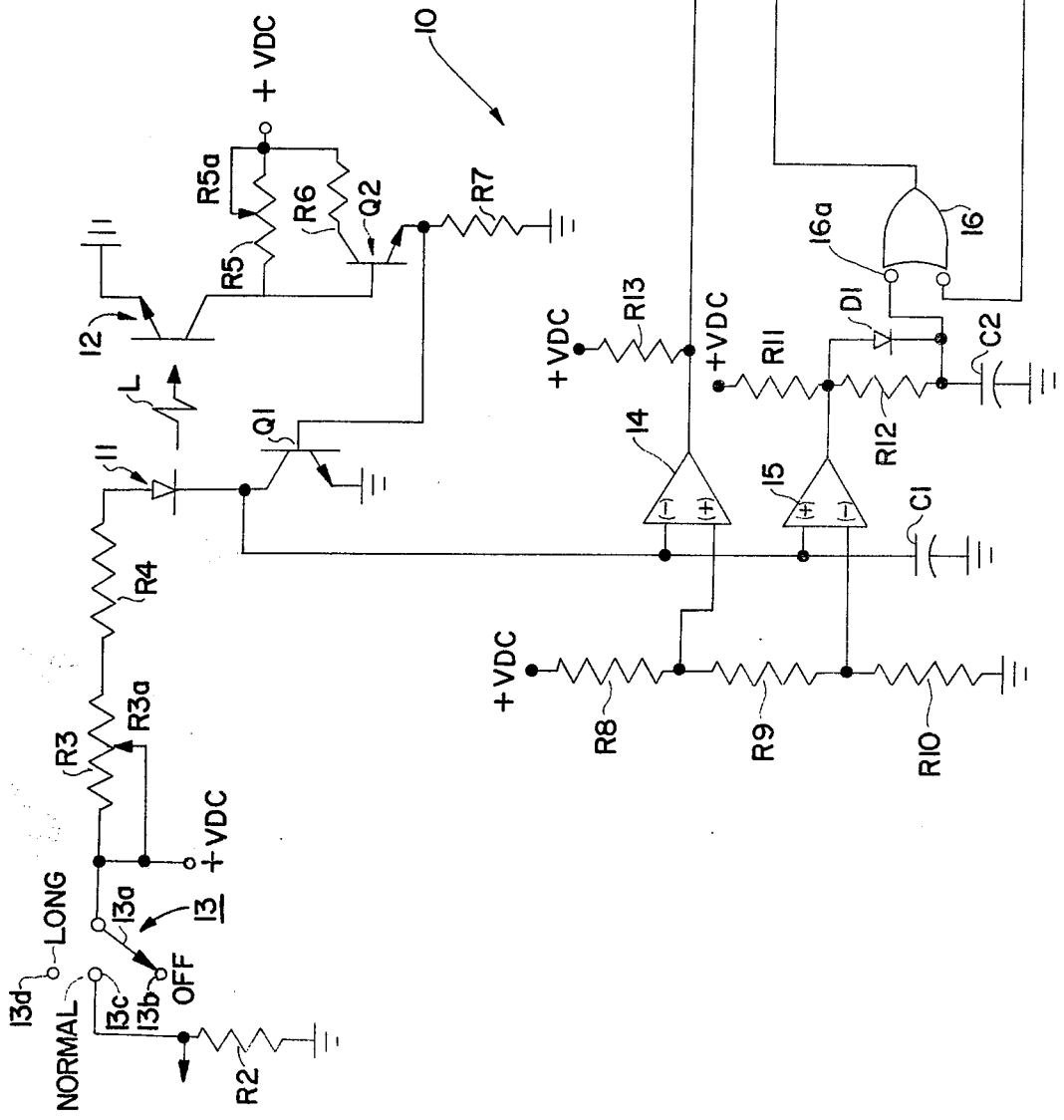
FIG. 2 is a schematic diagram of a doubles detection circuit designed in accordance with the principles of the present invention.

Thus it is possible through the circuitry to be described to achieve a high precision doubles detection circuit through filtering and comparator techniques which are embodied in the doubles detection circuitry 10 shown in FIG. 2 which is comprised of LED 11 and photo-transistor 12. The adjustment for the type of documents being handled is provided for by adjustable resistor R3 having adjustable arm R3a. One terminal of resistor R3 is connected to voltage source +VDC. The opposite terminal of resistor R3 is coupled through fixed resistor R4 to the anode of LED 11, whose cathode is coupled to the collector of transistor Q1.

The photo-transistor 12 has its emitter coupled to ground and has its collector coupled in common to the base of transistor Q2 and one terminal of adjustable resistor R5, whose other terminal is connected in common to the source +VDC and to the collector of Q2 through resistor R6. The emitter of Q2 is coupled to ground through R7 and to the base of transistor Q1 whose emitter is coupled to ground and whose collector is coupled to the anode of LED 11.

The operation of this circuit is as follows:

When energized, the maximum intensity of the light L emitted from LED 11 is controlled by the adjustment of resistor arm R3a. With this basic adjustment, light of a predetermined intensity is directed toward photo-transistor 12. The amount of light reaching photo-transistor 12 is dependent upon the light transmission characteristics of the document (or documents) passing therebetween. Presuming the light transmission characteristic is high, the photo-transistor will approach saturation causing maximum or near maximum current to be present in the collector circuit, developing a large IR drop across R5, dropping the voltage at the base of Q2. This results in a drop in the emitter current, causing a small IR drop to be developed across R7 thereby dropping the voltage applied to the base of Q1. The above circuit coupled to LED 11 automatically regulates (and in this case drops) the current flow therethrough so as to regulate the intensity of its light output. Obviously for low light intensity, the reverse operation occurs wherein when a low magnitude current flows through photo-transistor 12 a small IR drop develops across R5 developing a larger voltage applied to the base of Q2 and hence a larger IR drop across R7, increasing the voltage applied to the base of Q1 and thereby increasing the current through the LED 11 and hence the brightness of the light output.

This unique circuit utilized the feedback technique described here and above for the purpose of maintaining the output of the photo-transistor substantially constant and significantly reducing the output of LED 11 so as to greatly increase its useful operating life.

Figure 1D:
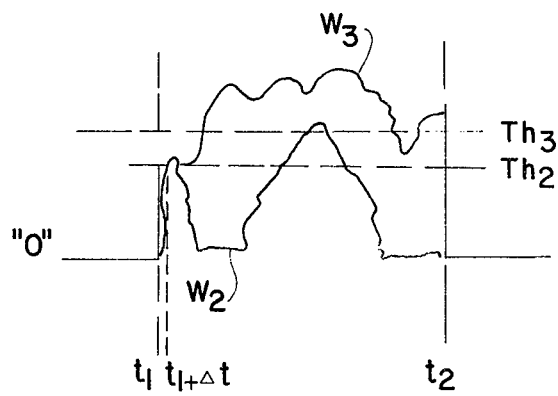

The output developed by the collector of Q1 is in fact utilized as the signal which may be said to be equivalent to those signals represented by the waveforms W2 and W3 of FIG. 1d.

This signal level is applied to the inverted input of a first comparator 14 and to the non-inverted input of a second comparator 15. The non-inverted input of comparator 14 is coupled to a voltage source +VDC through resistor R8 which together with fixed resistors R9 and R10 form a voltage divider circuit which serve as the threshold voltage levels, as will be more fully described.

A capacitor C1 couples the inverted input of comparator 14 and the non-inverted input of comparator 15 to a reference potential as shown.

The output of comparator 15 is coupled between the terminals of resistors R11 and R12 shown. Resistor R11 is coupled to the voltage source +VDC while the resistor R12 is coupled to reference potential through capacitor C2. A diode D1 is coupled in parallel across resistor R12.

The common terminal between R12 and C2 is coupled to one input of NOR gate 16 which is coupled to the reset input R of bi-stable flip-flop 17.

The output of comparator 14 is coupled to voltage source +VDC through resistor R13 and the output is further coupled in common to the reset R input of a bi-stable flip-flop 18.

The operation of the first comparator circuit comprised of comparator 15 is as follows:

Light emitted from LED 11 is directed toward photo-transistor 12. The intensity of the light reaching photo-transistor 12 is a function of the light transmission characteristic of the bill or other document passing therebetween. The automatic adjustment of light output intensity for LED 11 is controlled by the feedback circuit comprised of transistors Q1 and Q2 and their associated resistors R5 and R7, as was described here and above.

Figure 1E:
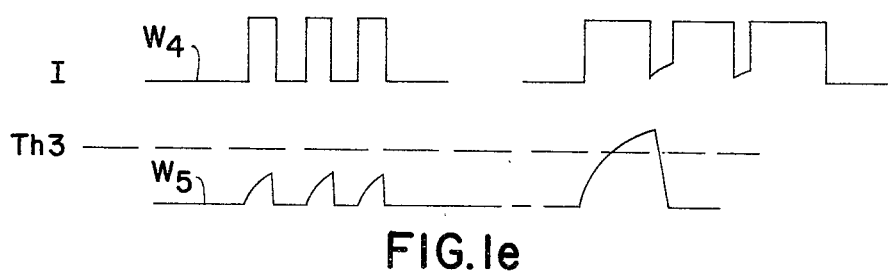

The output signal from the sensing circuit is taken from the collector of Q1 and is applied to the non-inverting input of comparator 15. A threshold level is established at the inverting input of comparator 15 by means of the voltage divider resistors R8 through R10, connected in series between +VDC and ground reference. The signal transitions about the threshold level cause the comparator to generate the square pulse signals shown in FIG. 1e which result from the passage of single bills and double fed bills, respectively.

The square pulse output signals are sustained so long as the transitions are above the threshold level as shown by waveform W4 is for single fed documents. The current output as shown by waveform W4 is directly coupled through diode D1 to capacitor C2 which charges at a rate established by the resistors R11 and R12 and diode D1 in circuit therewith.

The individual pulses are integrated as shown by the waveform W5. However, it can be seen that these pulses are significantly separated in time and are each individually brief in duration so that the pulses do not combine with one another to exceed the threshold level Th3.

On the other hand, when double fed documents pass between LED 11 and photo-transistor 12, the duration of either single transition alone or taken together with the number of transitions occuring, combine to raise the output signal at terminal 17 to a level above threshold Th3 sufficient to provide a signal indicative of the passage of double fed documents.

This signal is applied through NOR gate 16 to the reset input R of a bi-stable flip-flop 17, whose set input S is coupled to reset means which functions to reset the document handling device after the occurence of double fed documents in readiness to clear this condition and begin new counting.

When the threshold level Th3 is reached, the output of Nor gate 16 goes negative causing the bi-stable flip-flop to be reset whereby the signal level at its Q output serves to energize an audible alarm and a braking circuit which halts the handling of documents following the doubles fed documents so that the last documents to be fed to an outfeed hopper are the double fed documents.

As was mentioned above, it is necessary to select the threshold level so that the apparatus is in actuality set for the detection of doubles fed documents for the type of documents being run.

For example, the operator may begin to run documents through the document handling and counting apparatus without paying direct attention to the last setting of the doubles detector device which setting may be the improper setting for the type of documents being run.

Thus the doubles detector circuit includes comparator 14 which serves the function of preventing the erroneous processing of documents in the following manner:

If the brightness limit of LED 11 is set too high, then single fed documents will not produce a signal which is applied to the (−) input of comparator 14 sufficient to cross the (+) input threshold voltage. Thus no output will be produced to reset flip-flop 18, and will thereby indicate a double. On the other hand, if the brightness limit of the LED 11 is set too low, even though comparator 14 will reset flip-flop 18, comparator 15 will provide a tripping signal to gate 16 even when handling single fed documents.

The output of comparator 14 is coupled to the reset input R of bi-stable flip-flop 18 whose set input S receives an input indicative of the presence of the leading edge of the document.

This sets the bi-stable flip-flop 18 so that its Q output is high. When single document detection occurs, a signal applied to reset input R of bi-stable flip-flop 18 causes the output Q to go low. This signal level is applied to one input of NAND gate 20, whose other input receives a signal indicative of the fact that the trailing edge of the document has occurred. In the event that a single detection has not occurred, the Q output of bi-stable flip-flop 18 will remain high, which condition develops a low level at the output of NAND gate 20 at the trailing edge of the document which, when coupled through NAND 16, applies a reset signal to the reset input R at bi-stable flip-flop 19 to provide a level of the Q output of this flip-flop indicative of the fact that double fed documents have passed between LED 11 and photo-transistor 12. Thus an automatic means is provided for indicating a doubles fed document condition even when such condition does not really exist, in order to halt the apparatus and alert the operator to move the control knob to the proper setting for the type of documents being handled. Since this "artificial" condition will occur for single fed documents, the condition will occur each time a single fed document passes through LED 11 and photo-transistor 12 to absolutely assure that the operator will direct attention to the setting of the doubles sense circuit.

Since conditions sometime arise wherein documents are not fed so that one is exactly on top of the other but overlap each other only partially, it is important to detect this condition since the overlapping clearly prevents these two documents from being detected and counted as two documents, the result being that the documents will be detected as one unusually "long" document. In order to be apprised of this condition, the circuitry of FIG. 3 may be employed. FIG. 3a shows the manner in which two such documents S1 and S2 may overlap. FIG. 3b showing the end view thereof. The manner of such detection is to select a time out period of a duration greater than the time required for the single fed non-overlapping documents to pass between the counting sense circuit. The counting sense circuit is comprised of basically the same elements, i.e. an LED 11 and a photo-transistor 12 arranged on opposite sides of the path of movement of the documents through the document handling and counting apparatus. A count pulse is generated as represented by the waveform W8 of FIG. 3, which pulse is at the "1" level over the length of the document or over a time interval t2−t1 which is equal to the time required for the document to pass between the LED photo-transistor combination. The positive level pulse is integrated through resistor R30 and capacitor C5, whose common terminal is coupled to the non-inverting input of a comparator 25. The inverting input is coupled to a common terminal between resistors R31 and R32 coupled between the +VDC voltage source and ground for establishing the proper threshold level at the non-inverting input. If the count pulse has a pulse interval greater than that for single fed documents, the threshold level will be surpassed causing the development of a timeout signal at the output of comparator 25. For example, let it be assumed that the documents being handled have a length of 2.5 inches measured in the feed direction. Thus the maximum length of two such documents which overlap very very slightly is approximately 5.0 inches. By selecting a threshold level less than the time required for a 5 inch document to pass between the photo-transistor and LED and significantly greater than the time required for a single fed document to pass therebetween, an adequate timeout signal will be provided to sense this condition and abruptly halt the equipment. In one preferred example, the timeout may be a time interval which is equivalent to the travel of a document of about 4.5 inches length so that an overlappage of the order of 0.60 inches will provide an indication of this condition. This capability, coupled with the capability of detecting the presence of documents which are fed in overlapping fashion and which overlap over a significantly greater portion of their surface area, could yield a doubles sense output signal while documents which may be overlapping slightly so that their overlapping portion may be their highest light transmissive characteristic, or are filtered out, will be detected by the timeout circuit shown for example in FIG. 3.

Figure 4:
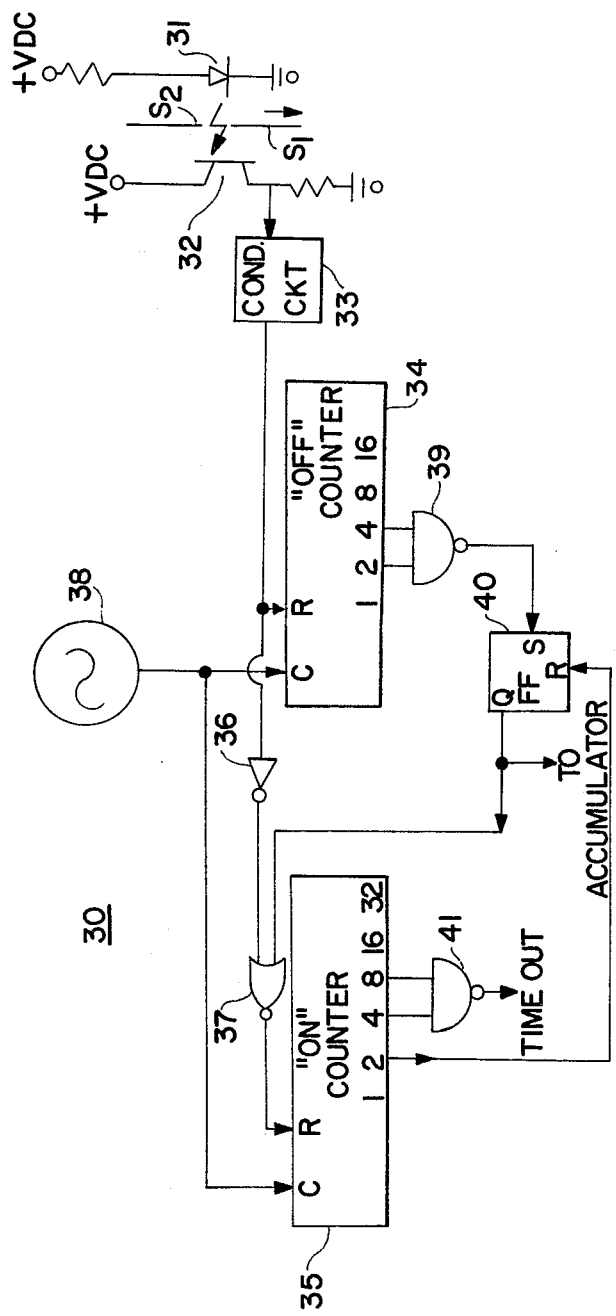
FIG. 4 is a schematic diagram showing a counting circuit utilized in connection with document handling devices and incorporating the principles of the present invention.

The circuitry of FIG. 3, as well as the apparatus for counting documents may, as an alternative to the use of integrating circuits, utilize multi-stage counters. For example, as shown in FIG. 4 the counting circuit 30 is comprised of an LED 31 and a photo-transistor 32 equivalent to that described here and above but now being utilized for the purpose of counting the documents. The current output of photo-transistor 32 is a function of the light impinging thereon, with the two major light levels being a reduced light level when a document is positioned between LED 31 and photo-transistor 32 and a higher magnitude light level when a gap is aligned with elements 31 and 32.

The output signal level appearing at the emitter of 32 is passed through a conditioning circuit which may preferably be of the type described in reissue U.S. Pat. No. Re. 29,470 issued Nov. 8, 1977 and assigned to the assignee of the present invention. The purpose of this circuit is to establish a satisfactory threshold level for differentiating between the presence of a gap and the presence of a document so as to be able to compare the output level of the photo-transistor with the threshold level through suitable comparator means as shown for example in FIG. 3a of the aforementioned reissued patent and thereby generate a signal which, when at a first discrete level, is indicative of the passage of the document and when at a second discrete level is indicative of the passage of a gap between elements 31 and 32. The output of the conditioning circuit 33 is coupled directly to the reset input R of multi-stage counter 34 and is further coupled to the reset input of multi-stage counter 35 through inverter 36 and NOR gate 37. Counters 34 and 35 may be characterized as "OFF" and "ON" counters respectively, indicative of the fact that they respectively count pulses when a gap and a document are passing between the elements 31 and 32. In the presence of a gap, the level at the reset input R allows counter 34 to accumulate pulses from a master clock 38 capable of generating constant frequency pulses at a frequency for example, of the order of 500 pulses per second. These pulses will continue to be accumulated whereby a predetermined number of pulses are indicative of the presence of a gap of suitable length. This condition may be detected through the utilization of a decoder gate 39 coupled to one or a plurality of selected output stages of the counter so that when that count is reached, the counter will provide the desired output. In the example given, it is assumed that when six such pulses from master clock 38 are accumulated, a gap of adequate length has been detected. Thus the output of gate 39 goes low causing the triggering of bi-stable flip-flop 40 which temporarily stores a count pulse. Its Q output is coupled through NOR gate 37 to provide the proper level at the reset input of "ON" counter 35 as will be more fully described.

As soon as the gap has been terminated and the document begins passing between elements 31 and 32, the level applied to the reset input R of "OFF" counter 34 maintains counter continuously in the reset condition preventing pulses from master clock 38 from being accumulated therein. However, this level is inverted by inverter means 36 and applied through gate 37 to the reset input of counter 35 which is now permitted to accumulate pulses from master clock 38 for the interval during which a document is passing between the elements 31 and 32. As was mentioned here and above, through the accumulation of an appropriate number of pulses indicative of the fact that an unusually "long" document is passing between elements 31 and 32, this condition is detected by decoder gate 41 to generate the timeout signal referred to here and above in conjunction with FIG. 3. One output of the "ON" counter may also be utilized to reset bi-stable flip-flop 40 in preparation for the next count to be developed therefrom. The Q output of flip-flop 40 is utilized to couple a count pulse to an accumulator (not shown) for providing a count of the total number of documents processed by the document counting and handling device. As an alternative arrangement to the pulsing of the counters 34 and 35 by master clock 38, these counters may be pulsed through the use of the magnetic sensor assembly 50 as shown in FIG. 5. The magnetic sensor comprises a coil 51 wound about a magnetic pole piece 52 having at least a portion or one end thereof positioned immediately adjacent to the teeth 53a of a magnetic timing gear 53 which is mounted upon the shaft of one of the rollers utilized to drive the documents being handled through the document handling and counting device. For example, the magnetic timing gear may be securely mounted to the shaft 24 of the acceleration roller identified by designating number 38 in FIG. 2a of the above mentioned U.S. Pat. No. 4,054,092. In one preferred embodiment, the timing gear may have 64 gear teeth and a two inch diameter so that each count in the counter will represent a travel distance of the order of 0.08 inches. As the gear teeth pass the gear sensor winding 51, a current is developed therein as represented by the waveform W7.

The signal represented by waveform W7 is applied to the non-inverting input of comparator 54, whose inverting input is coupled to the common terminal between resistors R21 and R22, connected in series between the voltage VDC and ground reference, thus establishing the threshold level represented by the dotted line Th5 shown in FIG. 5. The resulting pulses are simultaneously applied to the clock inputs C of counters 34 and 35 in place of the pulses developed by master clock 38 shown in FIG. 4. The advantages of this circuit reside in the fact that since the document handling and counting device of the above mentioned U.S. Pat. No. 4,054,092 positively drive the documents with effectively no slippage, instead of measuring time and converting time into distance with the use of master clock 38, the magnetic sensing circuit directly measures distance thereby directly measuring the size or length of the document with greater accuracy.

Thus, regardless of whether an overlap, gap, timeout or doubles feed condition occurs, the frequency of the pulses will be a direct function of the operating speed of the device and no reduction in quality or accuracy will occur due to any changes in the operating speed of the document handling and counting device either because of changes in speed due to deliberate speed change adjustments provided for by manual means or due to vagaries or spurious conditions within the system thereby providing a generating means whose pulses are a function of the operating speed i.e. rotating speed of the shaft upon which the magnetic timing gear is mounted to provide a more accurate sensing means that the master clock 38.

In applications where it is desired to select between the two generating sources, the switching circuitry of FIG. 6 may be employed wherein clock pulses from the master oscillator 38 are applied to one input of NAND gate 56 while pulses from the magnetic sensor 50 are applied to NAND gate 57. An input terminal 58 is coupled directly to the remaining input of NAND gate 57 and is coupled to the remaining input of NAND gate 56 through inverter 59. The outputs of NAND gates 56 and 57 are coupled to respective inputs of the NOR gate 60 and by appropriate positioning of the run switch 61 it is possible to select either master clock 38 or the magnetic pulse generator 50 to operate the apparatus for respective applications wherein constant speed operation is to be regularly employed allowing for the selection of the master clock whereas when operation with speed changes will be required or desired the output of the magnetic pulse generator 50 may be selected. Although there has been described herein the use of a light sensor or alternatively the use of a magnetic sensor for counting purposes, any other suitable sensing means may be employed.

The gates 39 and 41 may be omitted and the accumulated count may be taken directly from one of the outputs of the counter stages (i.e. "1", "2", "4", "8", etc.). Also an accumulated counter from either the "ON" or the "OFF" counters 35 and 34 may be employed to generate the pulse representing the count of a document.

As a further alternative, a predetermined count accumulated in the "OFF" counter may be employed to prevent the "ON" counter from being reset. For example when a document passes between elements 31 and 32, count pulses from the clock 38 are accumulated in counter 35. If a punched hole or the like passes between the elements 31 and 32 it will cause the light intensity reaching photo-transistor 32 to increase to appear as a "gap". However when the length of the punched hole is much less than the length of a gap, it is preferred even though the counter 35 stops accumulating pulses, that the count accumulated to that point remain in counter 35, to permit the count to be resumed in cases where punched holes or other perforations are detected.

FIG. 7 shows the circuitry for accomplishing this objective like elements as between FIGS. 4 and 7 being designated by like numerals.

When no "gap" or "hole" is detected, the low level of document sense photo-transistor is coupled through inverter 71 and NOR gate 72 and inverter 73 to apply a high level to the reset input "R" of OFF counter 34 preventing the OFF counter from accumulating counts. The low level is also coupled to one input of NAND gate 74 which maintains the output of NAND gate 74 high. This high output drives the output of nor gate 75 low to enable on counter 35 to accumulate count pulses from master clock 38.

When four counts are accumulated Q3 output of counter 35 applies a pulse of reset input R of flip-flop 77 driving its Q output low driving the output of NAND gate 74 to maintain its output high and thereby maintain the output of NOR gate low to allow counts to cintinue to be accumulated, the accumulation of four counts being assumed to identify a valid document.

When a "hole" is detected the input to inverter 71 goes high causing the outputs of inverter 71, gate 72 and inverter 73 to go low, high and low, respectively, enabling OFF counter 34 to accumulate a count while ON counter continues to accumulate counts at the pulse rate. When eight pulses are accumulated, the Q4 output, coupled to the set input S of flip-flop 78, sets the flip-flop to apply a level to NAND gate 80 causing inverter 81 to apply a level to one input of gate 82 and the set input S of flip-flop 83.

Gate 82 is coupled through NOR gate 16 (see FIG. 2) to reset the DOUBLES flip-flop 19 (see FIG. 2).

When the count in ON counter 35 reaches 20 the Q3 and Q5 outputs go high, driving the output of NAND gate 88 low applying a high to one input of NAND gate 90 through inverter 89. The middle input of gate 90 is high when flip-flop 83 is reset. The remaining input is high when handling normal documents causing the output of gate 90 to go low, driving the output of NOR gate 91 high to set the Q output of TIME flip-flop 92 high which is employed to turn off the document handling device motor and activate an alarm.

When the count in ON counter 35 reaches 32 and either the normal size documents setting is chosen by moving switch means SW1 to the proper position, or the first document is not being counted, NOR gate 93 goes high driving the output of NAND gate 94 low enabling gate 91 to set the TIME flip-flop 92 to activate the alarm and turn off the motor as was described above.

The FIRST document flip-flop is employed to provide an additional delay when the document handling device is restarted after clearing a jam or completing a batch of documents whereupon the device has stopped, leaving the leading edge of the next document to be passed between the count sensor 12 (see FIG. 2) a distance typically in the range from 0.125 inches to 0.75 inches from the sensor 12.

The device must accelerate this document from a rest condition to normal operating speed which requires more time for this document to pass the sensor 12 than succeeding documents. This problem is not encountered when using a magnetic pulse generator of the type shown in FIG. 5.

The "1st" document flip-flop has its Q output set low when a batch is completed, when the manual reset is depressed or when an idle stop signal is generated. Any one of these conditions are passed by NOR gate 97 to the reset input R of flip-flop 83 to set its Q output low and prevent gate 94 from generating an output indicative of a "long" document.

The Q output is also coupled through inverter 95 to drive one input of gate 76 high so that the first count of OFF counter drives its output low causing gate 75 to place a high level on the reset input R of ON counter 35 to prevent the counter from accumulating any counts. When two counts are accumulated by OFF counter 34, its Q2 output applies a signal to set input S of "1st" flip-flop 83 through gate 80 and inverter 81 to drive the Q output high. Inverter 95 thus places a low level to one input of gate 76 maintaining it high to cause gate 75 to remove the reset level from reset input R of ON counter 35 enabling count pulses to be accumulated. This operation provides a delay of a time sufficient to allow the first document to accelerate to normal counting speed without accumulating a number of counts representative of a long document.

An accumulated count of two in OFF counter 34 is used to reset flip-flop 78 and set flip-flop 77.

The OFF counter is preferably provided with a sufficient number of stages to provide a count at output Qx to generate a signal indicating a gap of about 250 millisecond length to sound an alarm identifying an unusually long gap between documents and an output Qy which sets a flip-flop 99 whose $\overline{Q}$ output goes high to stop the handling and counting device when a "gap" of 15 seconds duration is detected, indicating that no documents have been counted for that period.

The circuitry shown in FIG. 7 also has the capability of providing for highly simplified calibration of the doubles detection level.

For example, when changing from one type of document to another, it is important to set the doubles detector adjustable resistor element to be sure that the light element 11 (see FIG. 2) emits light of the proper intensity to prevent a single fed document from erroneously creating a doubles detection signal and likewise to prevent a doubles fed condition from failing to generate a doubles detection signal.

This is accomplished by moving switch arm 13a to its OFF position. Documents are run with the knob (R3A) set to enable light element 11 to provide its brightness output.

The stationary (OFF) contact 13b couples resistor R30 to ground reference placing a low level at one input of NAND gate 111 (FIG. 7). This keeps the output of NAND gate 111 high regardless of the level at its remaining input. A motor braking circuit 113 is responsive to a low level at its input 113a to stop the feeding of documents. Thus the OFF position of the doubles detection switch prevents the doubles condition from affecting the motor control circuit even if a doubles condition is sensed.

An observable DOUBLES condition capability is provided by the current driver circuit 110 and "DOUBLES" lamp 112. Whenever a doubles condition is sensed (as described in connection with FIG. 2) the $\overline{Q}$ output of the doubles detection circuitry goes high to apply a high level to current amplifier 110 and gate 111. The high level applied to the current amplifier causes lamp 112 to light providing a visual indication of a double feed condition, regardless of the fact that the double detection switch 13' is ON or OFF—when ON the gate 111 will be enabled to create a low condition at its output when both of its inputs are high to activate the motor control circuit 113 and turn the motor of the document handling device off and preferably activate braking means (not shown) in addition thereto. These capabilities form part of the apparatus described in the above mentioned U.S. Patents. For example, see motor M and brake 131 in FIG. 2 of U.S. Pat. No. 3,857,559.

Figure 8:
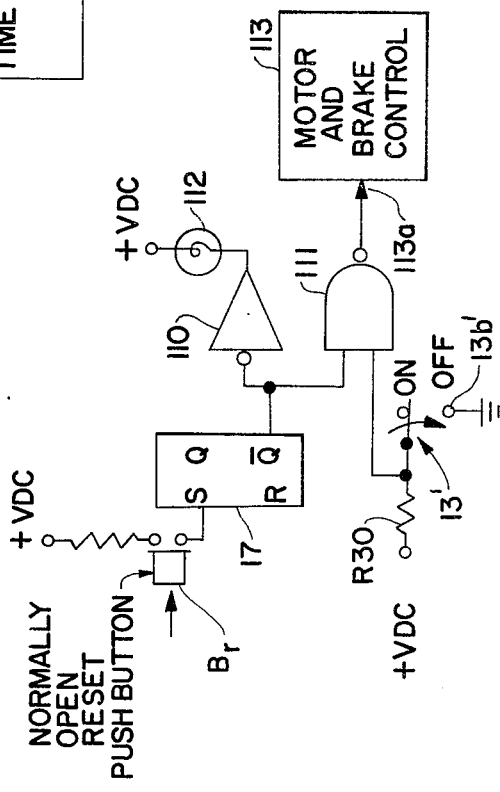
FIG. 8 is a schematic diagram of a doubles detection circuit adapted to identify a double feed condition and/or halt the handling operation and is also useful in providing a semi-automatic brightness setting.

The circuitry of FIG. 8 may also be used to great advantage as semi-automatic means for adjusting the brightness level when the type of documents being processed are changed.

To accomplish the adjustment the doubles detection switch is moved to the OFF state to prevent any turn-off of the unit in the event of any double feeds.

The control knob K mechanically coupled to adjustable resistor switch arm R3A (see FIG. 2) is rotated counter-clockwise to the LIGHT position to set element 11 for its highest light output (i.e. for the darkest or least light transmissive documents). If the light output is too high, flip-flop 18 is prevented from being reset by comparator 14 to indicate the presence of a double.

Turning the knob K to the dark setting (i.e. for very thin or highly light transmissive documents) comparator 15 will cause even a single document to provide a double feed signal. Adjustment is made by turning knob K clockwise so that its indicator I is aligned with the next graduation to the right of "DARK" setting and running the documents through again. If the lamp lights again, repeat the operation (i.e. moving one graduation to the right) until the lamp 112 remains off thereby yielding a simple and yet rapid method for setting the proper threshold level.

Whenever lamp 112 is lit, it may be turned off by depressing normally-open reset button Br to reset the DOUBLE flip-flop 19 (FIGS. 2 and 8).

The arrangement of FIG. 8 provides the equipment with the additional capability of being able to run documents at high speed and be advised of the occurrence of a doubles condition (or conditions) each time lamp 112 lights, without stopping the equipment each time. Stacks of documents yielding a doubles indication may be set aside for evaluation at a later time, enabling counting and processing to continue at high speed with no stopping but with a doubles sensing capability continuously monitoring the processing operation.

I claim:

1. Sensing means for distinguishing between single and double fed documents moving along a feed path at spaced intervals so that the trailing edge of each document is normally spaced from the leading edge of the next succeeding document, said means comprising:
    sensing means including a light sensing element positioned to one side of said path;
    a light source positioned on the opposite side of said path and aligned so that its light rays are directed toward said light sensing element;
    comparator means for comparing the output of said light sensing means, which varies as a function of the light transmission characteristic of the passing documents, against a predetermined threshold for generating a constant level output when the level of the sensing means output reaches the threshold valve;
    means coupled to the output of said comparator means for averaging the signal at said comparator means output; and
    means for generating a doubles sense signal when the level of the averaged signal reaches a predetermined threshold.

2. The sensing means of claim 1 wherein said light source is a light emitting diode.

3. The sensing means of claim 1 wherein said light sensing element is a photo-transistor.

4. The sensing means of claim 3 wherein the current output of the photo-transistor is increased as the light intensity increases until the photo-transistor reaches saturation, at which time the current output remains constant regardless of increasing light intensity; and
    adjustable brightness control means for controlling the output of the light source to lie within a brightness range whose upper limit is chosen to prevent the photo-transistor from going into saturation for the type of documents being sensed so that the differences in output levels as between single and double fed documents are maximized.

5. The sensing means of claim 4 wherein the adjustable brightness control means comprises a power supply source and adjustable resistance means for adjustably limiting the current supplied to said light source by said power supply source.

6. Apparatus for distinguishing between single and double fed documents moving along a feed path at spaced intervals so that the trailing edge of each document is spaced from the leading edge of the next succeeding document, said means comprising:
    sensing means including a light sensing element positioned to one side of said path;
    a light source positioned on the opposite side of said path and aligned so that its light rays are directed toward said light sensing element;
    comparator means for comparing the output of said light sensing means, which varies as a function of the light transmission characteristic of the passing documents, against a predetermined threshold for generating a constant level output when the level of the sensing means output reaches the threshold value;
    means responsive to the output of said light sensing element for controlling the brightness of the light output of said light source so that it is inversely proportional to the magnitude of the output signal generated by said light sensing element.

7. The apparatus of claim 6 further comprising current limiting transistor means having a collector coupled in series with said light source and having a base controlled by the output of said controlling means to limit the current supplied to the light source.

8. The apparatus of claim 7 wherein said controlling means includes current amplification means for supplying ample operating current to the base of said current limiting transistor.

* * * * *

UNITED STATES PATENT AND TRADEMARK OFFICE
CERTIFICATE OF CORRECTION

PATENT NO. : 4,237,378
DATED : December 2, 1980
INVENTOR(S) : Alan P. Jones

It is certified that error appears in the above—identified patent and that said Letters Patent is hereby corrected as shown below:

Column 4, line 66, after "29,470", insert --.--.

Column 5, line 11, change "vO" to --$v_o$--.

Column 5, line 63, change "vO" to --$v_o$--.

Column 6, line 64, change "frew" to --few--.

Column 8, line 38, delete "is".

Column 8, line 59, change "occurence" to --occurrence--.

Column 9, line 41, change "of" (second occurrence) to --at--.

Column 9, line 65, change "." to --,--.

Column 11, line 67, change "number" to --numeral--.

Column 12, line 10, before "VDC", insert --source--.

UNITED STATES PATENT AND TRADEMARK OFFICE
CERTIFICATE OF CORRECTION

PATENT NO. : 4,237,378
DATED : December 2, 1980
INVENTOR(S) : Alan P. Jones

It is certified that error appears in the above—identified patent and that said Letters Patent is hereby corrected as shown below:

Column 12, line 36, change "that" to --than--.

Column 13, line 27, change "of" (first occurrence) to --to--.

Column 13, line 30, change "cintinue" to --continue--.

Signed and Sealed this

Twenty-eighth Day of April 1981

[SEAL]

Attest:

RENE D. TEGTMEYER

Attesting Officer

Acting Commissioner of Patents and Trademarks